(12) United States Patent
Everard et al.

(10) Patent No.: US 8,905,269 B2
(45) Date of Patent: Dec. 9, 2014

(54) DEVICE FOR DISPENSING POURABLE MATERIALS

(71) Applicant: E I du Pont de Nemours and Company, Wilmington, DE (US)

(72) Inventors: John D Everard, Wilmington, DE (US); Charles T Reed, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/737,229

(22) Filed: Jan. 9, 2013

(65) Prior Publication Data

US 2014/0190994 A1 Jul. 10, 2014

(51) Int. Cl.
*B67D 7/84* (2010.01)
*B67D 3/00* (2006.01)

(52) U.S. Cl.
CPC .................................... *B67D 3/0051* (2013.01)
USPC ......................................... 222/166; 222/108

(58) Field of Classification Search
USPC ................. 222/164–167, 173, 175, 180, 108; 211/80–82; 414/421, 425; 248/133, 248/139, 140; 366/185; 312/209, 229, 248, 312/249.7
See application file for complete search history.

(56) References Cited

U.S. PATENT DOCUMENTS

| 242,705 | A | * | 6/1881 | Spachmann | 211/80 |
| 323,612 | A | * | 8/1885 | Werner | 222/166 |
| 434,018 | A | * | 8/1890 | Franks | 248/140 |
| 496,537 | A | * | 5/1893 | Purrington | 141/364 |
| 637,738 | A | * | 11/1899 | Ludwig | 248/140 |
| 670,978 | A | * | 4/1901 | Young | 248/140 |
| 691,039 | A | * | 1/1902 | Worf | 248/133 |
| 692,434 | A | * | 2/1902 | Elliott | 248/140 |
| 711,339 | A | * | 10/1902 | Park | 248/141 |
| 711,705 | A | * | 10/1902 | Keen | 248/133 |
| 996,658 | A | * | 7/1911 | Minor | 248/142 |
| 1,403,023 | A | * | 1/1922 | Fouts | 248/129 |
| 1,742,041 | A | * | 12/1929 | Mangold | 248/141 |
| 1,755,745 | A | * | 4/1930 | Parr | 248/141 |
| 1,791,005 | A | * | 2/1931 | Shepard | 248/142 |
| 1,808,988 | A | * | 6/1931 | Lang, Jr. | 248/140 |

(Continued)

OTHER PUBLICATIONS

"Pour Thing" Amazon.com product listing, purchased Feb. 6, 2013, downloaded from http://www.amazon.com/Pour-Thing-Liter-Model-561623/dp/B002BUXU4K.

*Primary Examiner* — J. Casimer Jacyna
*Assistant Examiner* — Randall Gruby

(57) ABSTRACT

A device is disclosed for dispensing pourable materials packaged in a pail or bulk container. The device comprising: a) a container holder comprising an angled shelf, a spring loaded locking clasp, a pair of support bands and a catch plate to support and hold the pail or bulk container in position when the device is in either the loading or dispensing position, b) locking catches to maintain the dispenser in an upright position allowing the pail or bulk container to be loaded into the dispenser; c) a base plate, on which the dispenser pivots and which is shaped so as to hold the dispenser in a rigid position on a mounting surface, such as a counter top or other flat surface, wherein the base plate comprises a locking device that tightens onto the surface to hold the dispenser in position, alternatively the base plate may be fitted with non-slip feet that prevent the device from moving during use, d) means to release the locking catches, e) means to pivot the dispenser forward so that the bulk container is in a horizontal position for dispensing the product.

19 Claims, 4 Drawing Sheets

(56) References Cited

U.S. PATENT DOCUMENTS

| | | | | |
|---|---|---|---|---|
| 1,829,353 | A | * | 10/1931 | Hogan .......................... 248/143 |
| 1,879,937 | A | * | 9/1932 | Kneeland ................... 211/85.18 |
| 2,043,896 | A | * | 6/1936 | Larsen et al. ................. 248/132 |
| 2,084,711 | A | * | 6/1937 | Smith ........................... 141/317 |
| 2,133,474 | A | * | 10/1938 | Roscoe ........................ 141/364 |
| 2,180,641 | A | * | 11/1939 | Milton .......................... 248/140 |
| 2,321,836 | A | * | 6/1943 | Marzo ....................... 222/386.5 |
| 2,324,747 | A | * | 7/1943 | Weissert ....................... 248/137 |
| 2,472,251 | A | * | 6/1949 | Houghton .................... 248/140 |
| 2,807,290 | A | * | 9/1957 | Hearn .......................... 141/375 |
| 2,830,782 | A | * | 4/1958 | Solberg ........................ 248/141 |
| 3,198,395 | A | * | 8/1965 | McKinney ................... 222/166 |
| 3,430,907 | A | * | 3/1969 | Newland et al. .............. 248/140 |
| 3,469,709 | A | * | 9/1969 | Wood ............................ 211/82 |
| 3,739,948 | A | | 6/1973 | Kontes |
| 3,814,293 | A | * | 6/1974 | Daves .......................... 222/173 |
| 3,974,942 | A | | 8/1976 | Gray et al. |
| 4,043,487 | A | * | 8/1977 | Price ............................ 222/166 |
| 4,150,806 | A | * | 4/1979 | Dziuk .......................... 248/154 |
| 4,355,737 | A | | 10/1982 | Pongrass et al. |
| 4,536,033 | A | * | 8/1985 | Allen .............................. 298/2 |
| 4,844,290 | A | * | 7/1989 | McCurdy et al. .......... 222/185.1 |
| 4,974,800 | A | * | 12/1990 | Tyson, Jr. ..................... 248/143 |
| D326,413 | S | * | 5/1992 | Vitous ........................... D9/455 |
| 5,244,020 | A | * | 9/1993 | Bruno et al. .................... 141/83 |
| 5,316,248 | A | * | 5/1994 | Allen ............................ 248/129 |
| 5,439,142 | A | * | 8/1995 | Robertson et al. ............ 222/164 |
| 5,624,043 | A | * | 4/1997 | Baptista ......................... 211/74 |
| 5,944,470 | A | * | 8/1999 | Bonerb ......................... 414/421 |
| 6,213,352 | B1 | * | 4/2001 | Boyer, Jr. ..................... 222/166 |
| 6,220,610 | B1 | * | 4/2001 | Cox .......................... 280/47.19 |
| 6,379,034 | B1 | * | 4/2002 | Schutz .......................... 366/185 |
| 6,379,099 | B1 | * | 4/2002 | Novak .......................... 414/421 |
| 6,550,649 | B2 | * | 4/2003 | Han et al. ..................... 222/166 |
| 6,575,413 | B1 | | 6/2003 | Straub |
| 6,808,149 | B1 | * | 10/2004 | Sendowski et al. ........ 248/311.3 |
| 6,820,940 | B2 | * | 11/2004 | Gonzalez ......................... 298/2 |
| D536,933 | S | * | 2/2007 | Perlman ...................... D7/619.1 |
| 7,344,112 | B2 | * | 3/2008 | Nice .......................... 248/125.1 |
| 7,434,603 | B2 | * | 10/2008 | Spear et al. ................... 141/363 |
| 7,896,200 | B2 | * | 3/2011 | Nakatsuji et al. ............ 222/165 |
| 8,011,622 | B1 | * | 9/2011 | Guthrie ........................ 248/139 |
| 2005/0029298 | A1 | * | 2/2005 | Sun ............................... 222/166 |
| 2005/0263542 | A1 | * | 12/2005 | Brezden ....................... 222/166 |
| 2007/0210109 | A1 | * | 9/2007 | Wiemholt .................... 222/166 |
| 2008/0197587 | A1 | * | 8/2008 | Nowak ........................... 280/30 |
| 2011/0259920 | A1 | * | 10/2011 | Rennie et al. ................ 222/165 |
| 2012/0139201 | A1 | * | 6/2012 | Chauza ..................... 280/47.19 |

* cited by examiner

DEVICE FOR DISPENSING POURABLE MATERIALS

BACKGROUND OF THE INVENTION

Oils and liquid shortenings are often delivered in 5 gallon pails or 35 lb bulk containers (e.g., JIBs; Jug In a Box). The process of emptying these containers can be both cumbersome and physically demanding, making it difficult to dispense liquids from them in a controlled and safe manner. It is therefore desirable to provide an adequate dispenser for the various types of containers.

Furthermore, in order to allow delivery of liquids from a container to a receptacle, an appropriate spigot is usually mounted on the container opening. Many types of spigots exist for emptying containers filled with liquids. Some of these spigots are commercially available from DS Smith Plastic Limited (World Wide Dispensers USA). For example, one such spigot facilitates the smooth delivery of fluids from single opening vessels by allowing air to enter the vessel, through the tap body, as the liquid is dispensed.

U.S. Pat. No. 4,355,737, issued Oct. 26, 1982, describes a fluid dispenser for a bulk container for portable fluids and the like.

U.S. Pat. No. 3,974,942, issued Aug. 17, 1976, describes a pouched oil dispenser.

U.S. Pat. No. 3,739,948, issued Jun. 19, 1973, describes a variable volume, predetermined-bulk liquid tilting dispenser.

SUMMARY OF THE INVENTION

In one embodiment the present invention comprises a container holder comprising an angled shelf, a spring loaded locking clasp, a pair of support bands and a catch plate to support and hold the pail or bulk container in position when the device is in either the loading or dispensing position.

Furthermore the invention includes locking catches to maintain the dispenser in an upright position allowing the pail or bulk container to be loaded into the dispenser; a base plate, on which the dispenser pivots and which is shaped so as to hold the dispenser in a rigid position on a mounting surface, such as a counter top or other flat surface, wherein the base plate comprises a locking device that tightens onto the surface to hold the dispenser in position. Alternatively, the base plate may be fitted with non-slip feet that prevent the device from moving during use. Additionally means to release the locking catches and means to pivot the dispenser forward so that the bulk container is in an elevated horizontal position for dispensing are included in the present invention.

Other embodiments of the present invention include a dispenser made of metal, such as food grade stainless steel, molded plastic, fiberglass or any other moldable material.

Yet another embodiment comprises pourable materials such as pourable granules, pourable powders, oils, liquid shortenings, salad dressings and other materials commonly shipped in bulk containers.

DESCRIPTION OF THE INVENTION

The present invention relates to a device that has been designed and fabricated to enable the safe and controlled dispersion of pourable materials, such as, but not limited to oils and liquid shortenings.

The device described here accepts both pail and box style containers. It has two positions. An upright position enables the operator to load the bulk container; clips prevent the containers from toppling over when the device is in the upright position. Spigots and adaptors, that are commercially available, are fitted to the bulk containers while in the vertical position and allow for the controlled dispensing of oil once the device is pivoted into the horizontal, dispensing position. The device is moved to its dispensing position by releasing two catches and pivoting the device at its hinge point. The bulk container is now in an elevated horizontal position for dispensing. Clips and braces prevent the containers from shifting when in the horizontal position.

A base plate (on which the device pivots) attaches to the countertop to ensure stable mounting of the device.

The device of the instant invention consists of food grade stainless steel but could be fabricated from materials, such as but not limited to molded plastic, fiberglass or any other moldable material. The material has to be capable of supporting the weight of the pails or bulk containers and must be capable of being maintained in a sanitary state.

With these and further objectives in view the present invention accordingly provides a device for dispensing pourable materials; comprising:

a) a container holder comprising an angled shelf, a spring loaded locking clasp, a pair of support bands and a catch plate to support and hold the pail or bulk container in position when the device is in either the loading or dispensing position, b) locking catches to maintain the dispenser in an upright position allowing the pail or bulk container to be loaded into the dispenser;

c) a base plate, on which the dispenser pivots and which is shaped so as to hold the dispenser in a rigid position on a mounting surface, such as a counter top or other flat surface, wherein the base plate comprises a locking device that tightens onto the surface to hold the dispenser in position. Alternatively, the base plate may be fitted with non-slip feet that prevent the device from moving during use, d) means to release the locking catches, e) means to pivot the dispenser forward so that the bulk container is in an elevated horizontal position for dispensing.

Furthermore, pourable materials can be materials such as but not limited to pourable granules, pourable powders, oils, liquid shortenings, salad dressings and other materials commonly shipped in bulk containers.

In one embodiment the present invention comprises a container holder comprising an angled shelf, a spring loaded locking clasp, a pair of support bands and a catch plate to support and hold the pail or bulk container in position when the device is in either the loading or dispensing position.

Furthermore the invention includes locking catches to maintain the dispenser in an upright position allowing the pail or bulk container to be loaded into the dispenser; a base plate, on which the dispenser pivots and which is shaped so as to hold the dispenser in a rigid position on a mounting surface, such as a counter top or other flat surface, wherein the base plate comprises a locking device that tightens onto the surface to hold the dispenser in position. Alternatively, the base plate may be fitted with non-slip feet that prevent the device from moving during use. Additionally means to release the locking catches and means to pivot the dispenser forward so that the bulk container is in an elevated horizontal position for dispensing are included in the present invention.

Other embodiments of the present invention include a dispenser made of metal, such as food grade stainless steel, molded plastic, fiberglass or any other formable or moldable material.
}

Yet another embodiment comprises pourable materials such as pourable granules, pourable powders, oils, liquid shortenings, salad dressings and other materials commonly shipped in bulk containers. The bulk containers that can be used with the device can include but are not limited to;

TABLE 1

Steel Pail
Plastic Pail
Jug In a Box (JIBS)
Bag In a Box (BIBS)
Free Standing Cubic containers
Free Standing rectangular containers The present invention is more fully illustrated by the following description in conjunction with the accompanying drawings. Broken line disclosure is understood to be for illustrative purposes only and form no part of the claimed design. Structure that is not part of the claimed design, but is necessary to show the environment in which the design is used, may be represented in the drawing by broken lines.

FIG. 1 is a schematic drawing of the overall assembly (10) of the dispenser with a loaded bulk pail/product container (14). A spigot (15) is attached to the product container, using a suitable adaptor, to allow pouring for the material into a receptacle. The container holder (12), which comprises a frontal surface (30), left side wall (16a), right side wall (16b), bottom plate (13) and surface (28), is mounted to a base plate (22), which is shaped to hold onto a counter top (24) and can be tightened with a locking bolt (23). Locking pins and brackets (29), which) secure the container holder in a fixed position while the product container is being loaded into the device. Once the locking pins (29) are disengaged from the base plate brackets the pivot point (25) allows the container holder to pivot into the elevated horizontal dispensing position. The product container is kept in place in the dispenser by a locking clasp (19) and by supporting bands (17a—left upper support band, 17b—right upper support band, 18a—left lower support band, 18b—right lower support band) and a catch plate (20). A removable drip pan (21) collects any spilled material during the pouring process from the product container to a receptacle. The locking pins (29) at the pivot point (25) and locking pin/base assembly are design such that the oil dispenser can be separated from the base plate (22) to facilitate cleaning.

EXAMPLES

Figure 1:
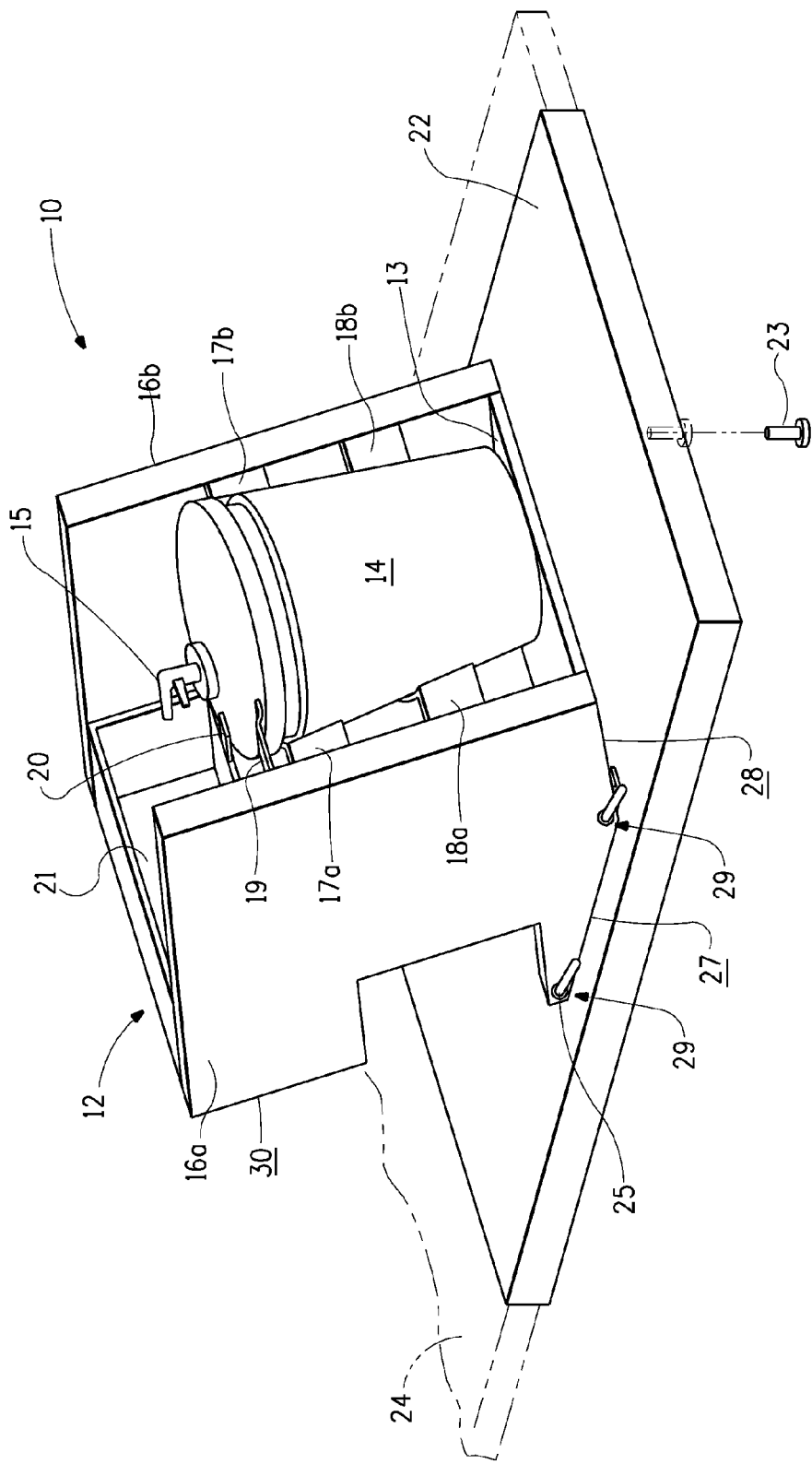
Figure 2:
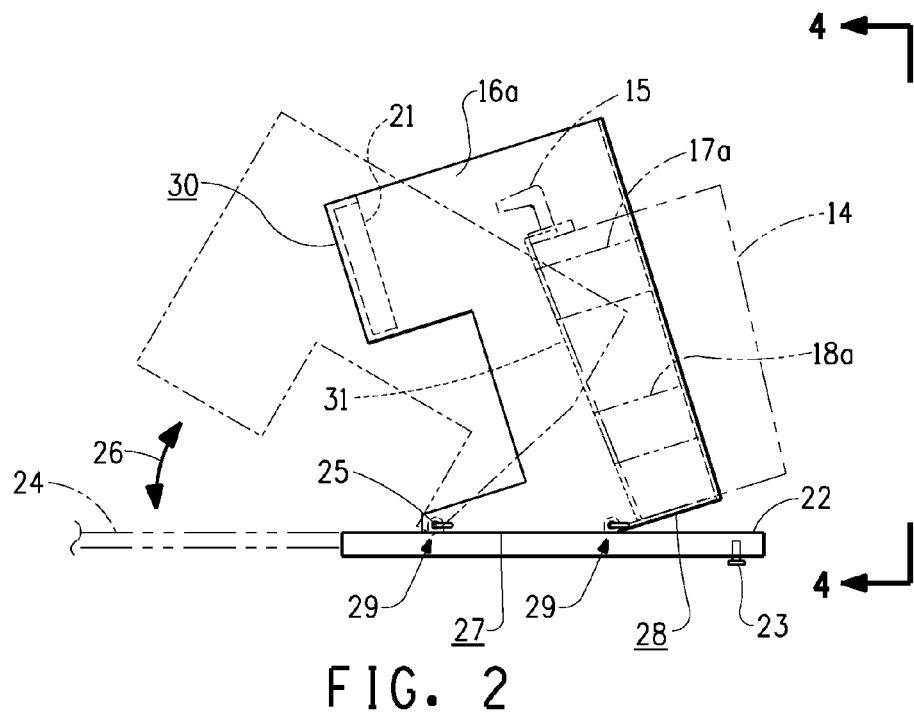
FIG. 2 and FIG. 3 are schematic drawings of the loaded dispenser while being pivoted forward (FIG. 2) so that the bulk container is in an elevated horizontal position (FIG. 3) for dispensing product. The angled shelf (31) allows for safe positioning of the product container.
Figure 3:
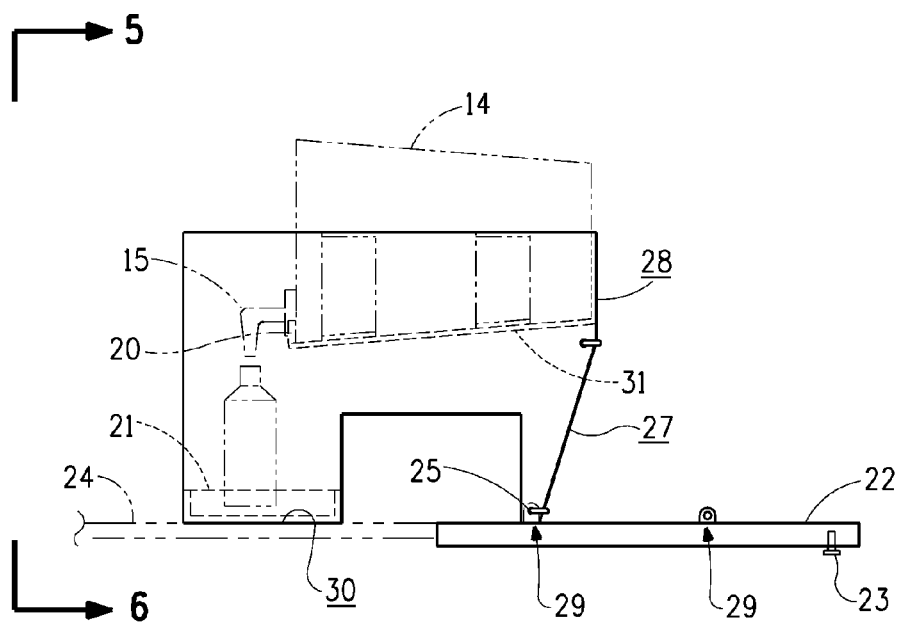
Figure 4:
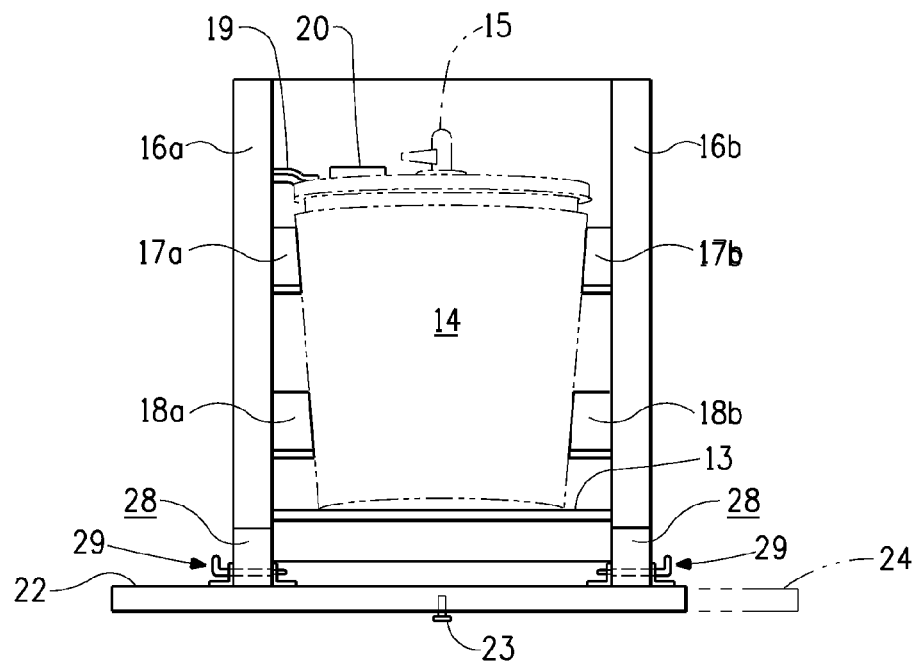
FIG. 4 is a schematic drawing showing the back of the loaded dispenser.
Figure 5:
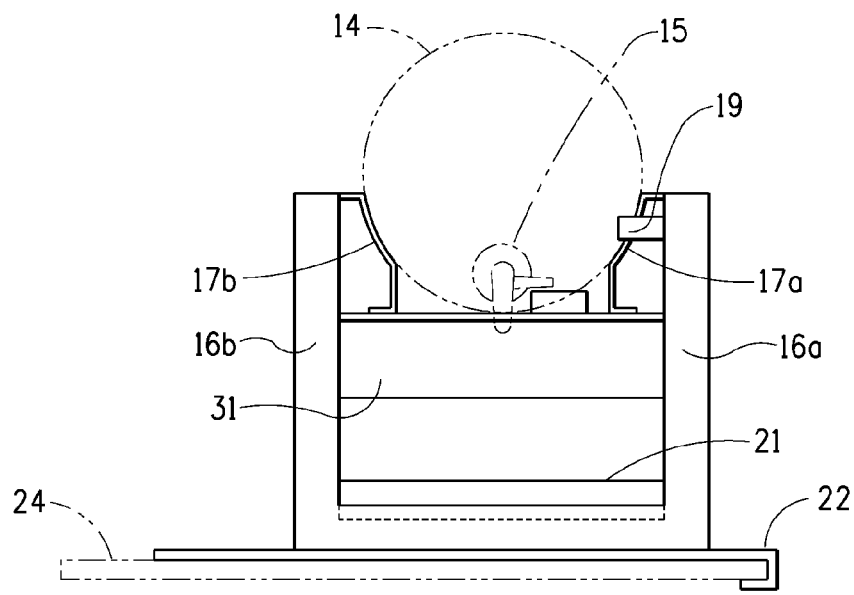
FIG. 5 is a schematic drawing showing the front of the loaded dispenser while pivoted forward into its elevated horizontal dispensing position.
Figure 6:
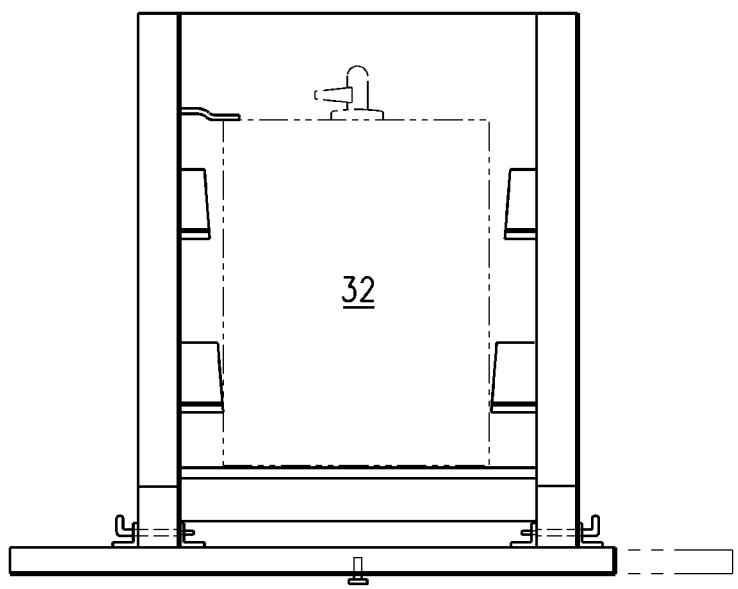
FIG. 6 is a schematic drawing of the dispenser loaded with an alternate product container (32).

The present invention is further illustrated in the following Examples, in which parts and percentages are by weight and degrees are Celsius, unless otherwise stated. It should be understood that these Examples, while indicating embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions. Thus, various modifications of the invention in addition to those shown and described herein will be apparent to those skilled in the art from the foregoing description. Such modifications are also intended to fall within the scope of the appended claims.

Example 1

Bulk containers, fitted with molded screw-capped spouts, are vigorously agitated to fully suspend the product prior to dispensing. With the dispenser latched in the up-right position (using the Locking Pin/Base Assembly Brackets) the bulk container is positioned such that it is cradled in the support bands (if a pail) or pressed against the bottom plate and shelf (if a rectangular container). The screw-capped spout on the bulk container is positioned such that it will be at the lowest position when the device is tilted into the elevated horizontal, dispensing, position. The locking clasp is adjusted to hook onto the lid rim of pails to prevent them from toppling from the device. The screw-capped lid is removed from the container spout and any underlying seal is completely removed. Container specific adaptors are then used to attach a spigot to the spout. Commercially available vented spigots that enable air to enter the bulk container as the product is dispensed are recommended to enable a safe and controlled dispensing process. An example of such are, "air return spigots" taps from DS Smith Plastic Limited (World Wide Dispensers USA). After ensuring that the spigot is in the closed position the locking pins (on the Locking Pin/Base Assembly) are released and the dispenser and bulk container are pivoted into the elevated horizontal dispensing position. When in the elevated horizontal position the bulk container is repositioned so that it is pressed against the catch plate. Product can then be dispensed through the spigot in a controlled manner. If the material in the container is sensitive to oxidation and a portion of the product is being retained in the container for storage, the container can be purged with an inert gas (e.g., nitrogen) to protect the product during extended periods of storage. This is achieved by flushing the headspace above the product with the inert gas prior to capping.

The invention claimed is:

1. A pourable materials dispenser for a cylindrical pail or rectangular or cubic bulk container, the dispenser comprising:
    a) a container holder comprising an angled shelf, a spring loaded locking clasp, a pair of support bands, a catch plate adapted to support and hold both a pail or a rectangular or cubic bulk container in position when the device is in either an upright loading or a horizontal dispensing position, and a frontal surface having a first side and a second side opposite the first side, wherein the first side of the frontal surface is configured to rest on a mounting surface when the container holder is in the horizontal dispensing position, and wherein the second side of the frontal surface is configured to hold a receptacle when the container holder is in the horizontal dispensing position;
    b) locking catches to maintain the container holder in the upright-loading position allowing the pail or bulk container to be loaded into the dispenser;
    c) a base plate, on which the container holder pivots and which is shaped so as to hold the dispenser in a rigid position on the mounting surface, wherein the base plate comprises a locking device that tightens onto the mounting surface to hold the dispenser in position;

d) means to release the locking catches; and
e) means to pivot the container holder forward so that the pail or bulk container is in the horizontal dispensing position.

2. The dispenser of claim 1, wherein the dispenser is made of a molded material.

3. The dispenser of claim 1, wherein the pourable materials are selected from the group consisting of: pourable granules, pourable powders, oils, liquid shortenings, and salad dressings.

4. A method for dispensing pourable materials comprising
positioning the container holder of claim 1 in the horizontal dispensing position, and
dispensing the pourable material from the pail or the bulk container.

5. The method of claim 2, wherein the molded material is selected from the group consisting of metal, food grade stainless steel, plastic, or fiberglass.

6. A pourable materials dispenser for cylindrical pail or rectangular or cubic bulk container, the dispenser comprising:
a) a base plate, on which a container holder pivots and which is shaped so as to hold the dispenser in a rigid position on a mounting surface, such as a counter top or other flat surface, wherein the base plate comprises non-slip feet configured to prevent the dispenser from moving during use;
b) the container holder comprising: an angled shelf; a spring loaded locking clasp; a pair of support bands; a catch plate adapted to support and hold both a pail or rectangular or cubic bulk container in position when the device is either in an upright loading or horizontal dispensing position; a frontal surface configured to rest on the mounting surface when the container holder is in a dispensing position;
c) locking catches to maintain the container holder in the upright-loading position allowing the pail or bulk container to be loaded into the dispenser;
d) means to release the locking catches; and
e) means to pivot the container holder forward so that the pail or bulk container is in the horizontal dispensing position.

7. A pourable materials dispenser comprising:
a) a base plate configured to securely mount the pourable materials dispenser on a mounting surface;
b) one or more locking brackets connected to one end of the base plate wherein the locking brackets comprise openings configured to receive one or more locking pins;
c) a container holder hingedly connected to the one or more locking brackets by the one or more locking pins and comprising a frontal surface, wherein the container holder is configured to pivot about the one or more locking pins such that the frontal surface rests on the mounting surface when the container holder is in a dispensing position; and
d) one or more additional locking brackets connected to an opposite end of the base plate wherein the additional locking brackets comprising openings configured to receive one or more additional locking pins, and wherein the additional locking pins are configured to hold the container holder in an upright position when inserted into the one or more additional locking brackets.

8. The pourable materials dispenser of claim 7 further comprising a container configured for placement in the container holder.

9. The pourable materials dispenser of claim 8 wherein the container comprises a cylindrical container.

10. The pourable materials dispenser of claim 8 wherein the container comprises a rectangular container.

11. The pourable materials dispenser of claim 8 wherein the container comprises a pail.

12. The pourable materials dispenser of claim 7 wherein the base plate is secured to the mounting surface by a locking device.

13. The pourable materials dispenser of claim 12 wherein the locking device is configured to tighten onto the mounting surface to prevent the pourable materials dispenser from moving during use.

14. The pourable materials dispenser of claim 7 wherein the base plate is secured to the mounting surface by non-slip feet.

15. The pourable materials dispenser of claim 7 wherein the frontal surface further comprises a drip pan configured to collect spilled material.

16. The pourable materials dispenser of claim 15 wherein the drip pan is removable.

17. The pourable materials dispenser of claim 7 wherein the container holder is removable.

18. The pourable materials dispenser of claim 7 wherein the container holder further comprises a locking clasp configured to securely hold a container in the container holder.

19. The pourable materials dispenser of claim 7 further comprising a catch plate configured to secure the container holder to the base plate.

* * * * *